United States Patent
Daly

(10) Patent No.: US 9,836,398 B2
(45) Date of Patent: *Dec. 5, 2017

(54) ADD-ON MEMORY COHERENCE DIRECTORY

(71) Applicant: International Business Machines Corporation, Armonk, NY (US)

(72) Inventor: David M. Daly, Croton on Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/744,354

(22) Filed: Jun. 19, 2015

(65) Prior Publication Data
US 2016/0321180 A1    Nov. 3, 2016

Related U.S. Application Data

(63) Continuation of application No. 14/700,526, filed on Apr. 30, 2015.

(51) Int. Cl.
| | |
|---|---|
| *G06F 12/00* | (2006.01) |
| *G06F 12/0831* | (2016.01) |
| *G06F 12/0817* | (2016.01) |

(52) U.S. Cl.
CPC ...... *G06F 12/0831* (2013.01); *G06F 12/0817* (2013.01); *G06F 2212/621* (2013.01); *G06F 2212/622* (2013.01)

(58) Field of Classification Search
CPC .. G06F 3/0644; G06F 12/128; G06F 12/0815; G06F 12/122; G06F 12/0223;
(Continued)

(56) References Cited

U.S. PATENT DOCUMENTS

| | | | | | |
|---|---|---|---|---|---|
| 5,893,149 | A | * | 4/1999 | Hagersten | G06F 12/0808 711/113 |
| 6,044,478 | A | * | 3/2000 | Green | G06F 12/0815 711/141 |

(Continued)

FOREIGN PATENT DOCUMENTS

| | | |
|---|---|---|
| JP | 2012093857 A | 5/2012 |
| KR | 1020070057532 A | 6/2007 |

(Continued)

OTHER PUBLICATIONS

List of IBM Patents or Patent Applications Treated as Related, 2 pages.

(Continued)

*Primary Examiner* — Reba I Elmore
(74) *Attorney, Agent, or Firm* — Stephen R. Tkacs; Stephen J. Walder, Jr.; Jennifer R. Davis

(57) ABSTRACT

A mechanism is provided for memory coherence in a multiple processor system. Responsive to a memory access resulting in a cache miss in a given processor, the processor determines whether a memory region being accessed is marked as directory-based. Responsive to the given processor determining the memory region is marked as directory-based, the given processor accesses a directory entry corresponding to the memory region to identify a home chip for the page using a directory-based protocol. The given processor forwards the memory access request to the home chip to perform the memory access.

16 Claims, 4 Drawing Sheets

(58) Field of Classification Search
CPC ............ G06F 12/2873; G06F 12/1009; G06F 1212/622; G06F 2212/69
USPC ........ 711/136, 146, 153, 154, 170; 709/136, 709/218, 226, 229; 710/11, 23, 120; 712/14, 32, 43
See application file for complete search history.

(56) References Cited

U.S. PATENT DOCUMENTS

| | | | | |
|---|---|---|---|---|
| 6,412,047 | B2* | 6/2002 | Shimizu | G06F 12/0835 711/141 |
| 6,560,682 | B1* | 5/2003 | Miller | G06F 9/52 711/118 |
| 6,754,787 | B2* | 6/2004 | Miller | G06F 9/52 711/118 |
| 6,857,048 | B2* | 2/2005 | Rankin | G06F 12/123 711/119 |
| 7,853,755 | B1 | 12/2010 | Agarwal et al. | |
| 8,037,252 | B2* | 10/2011 | Toussi | G06F 12/0817 711/135 |
| 8,151,057 | B1* | 4/2012 | Koster | G06F 12/0833 711/130 |
| 8,285,969 | B2* | 10/2012 | Khubaib | G06F 12/0831 711/207 |
| 8,364,851 | B2 | 1/2013 | Kessler et al. | |
| 8,370,584 | B2* | 2/2013 | Cantin | G06F 12/084 365/189.03 |
| 8,370,595 | B2* | 2/2013 | Guthrie | G06F 12/0284 711/118 |
| 8,560,780 | B1* | 10/2013 | Agarwal | G06F 12/0811 711/141 |
| 9,361,229 | B2* | 6/2016 | Aronovich | G06F 12/0813 |
| 2003/0115402 | A1* | 6/2003 | Dahlgren | G06F 12/0831 711/1 |
| 2004/0003184 | A1* | 1/2004 | Safranek | G06F 12/082 711/146 |
| 2004/0034747 | A1* | 2/2004 | Rowlands | G06F 12/0824 711/148 |
| 2005/0188159 | A1* | 8/2005 | Van Doren | G06F 12/0831 711/144 |
| 2005/0240736 | A1* | 10/2005 | Shaw | G06F 12/082 711/146 |
| 2005/0251631 | A1* | 11/2005 | Rowlands | G06F 12/084 711/145 |
| 2006/0080398 | A1* | 4/2006 | Hoover | G06F 12/084 709/213 |
| 2006/0080511 | A1* | 4/2006 | Hoover | G06F 12/0828 711/141 |
| 2006/0080513 | A1* | 4/2006 | Beukema | G06F 12/0828 711/141 |
| 2007/0226423 | A1* | 9/2007 | Arimilli | G06F 12/084 711/141 |
| 2007/0255906 | A1* | 11/2007 | Handgen | G06F 12/0817 711/141 |
| 2008/0086601 | A1* | 4/2008 | Gaither | G06F 12/0824 711/141 |
| 2008/0109624 | A1 | 5/2008 | Gilbert et al. | |
| 2008/0270692 | A1 | 10/2008 | Cochran et al. | |
| 2009/0006770 | A1* | 1/2009 | Blumrich | G06F 12/0822 711/146 |
| 2009/0182893 | A1* | 7/2009 | Anand | G06F 12/0831 709/238 |
| 2009/0240869 | A1* | 9/2009 | O'Krafka | G06F 12/0284 711/103 |
| 2009/0276579 | A1* | 11/2009 | Moyer | G06F 12/0804 711/141 |
| 2010/0115236 | A1 | 5/2010 | Bataineh et al. | |
| 2010/0235586 | A1* | 9/2010 | Gonion | G06F 12/0831 711/144 |
| 2010/0332763 | A1* | 12/2010 | Kornegay | G06F 12/0815 711/130 |
| 2010/0332771 | A1 | 12/2010 | Gray et al. | |
| 2011/0055515 | A1* | 3/2011 | Khubaib | G06F 12/0831 711/207 |
| 2011/0060879 | A1 | 3/2011 | Rogers et al. | |
| 2011/0252200 | A1* | 10/2011 | Hendry | G06F 12/0831 711/121 |
| 2011/0276762 | A1* | 11/2011 | Daly | G06F 12/0804 711/122 |
| 2012/0137079 | A1* | 5/2012 | Ueda | G06F 12/1036 711/141 |
| 2012/0226868 | A1 | 9/2012 | Ceze et al. | |
| 2012/0239883 | A1* | 9/2012 | Jain | G06F 12/0813 711/122 |
| 2012/0265942 | A1* | 10/2012 | Cantin | G06F 12/084 711/144 |
| 2012/0317369 | A1 | 12/2012 | Beers et al. | |
| 2013/0073811 | A1* | 3/2013 | Beckmann | G06F 12/0817 711/141 |
| 2013/0097385 | A1* | 4/2013 | Beckmann | G06F 12/084 711/128 |
| 2013/0110959 | A1 | 5/2013 | Sharp et al. | |
| 2013/0185522 | A1 | 7/2013 | Moga et al. | |
| 2013/0318308 | A1* | 11/2013 | Jayasimha | G06F 12/0833 711/146 |
| 2014/0032853 | A1* | 1/2014 | Lih | G06F 12/0817 711/141 |
| 2014/0040561 | A1* | 2/2014 | Lih | G06F 12/0831 711/135 |
| 2014/0040562 | A1 | 2/2014 | Koka et al. | |
| 2014/0181417 | A1* | 6/2014 | Loh | G06F 12/0828 711/141 |
| 2014/0189285 | A1 | 7/2014 | Conrad et al. | |
| 2015/0370720 | A1* | 12/2015 | Rowlands | G06F 12/0891 711/133 |
| 2016/0034398 | A1* | 2/2016 | Wendel | G06F 12/0831 711/129 |
| 2016/0092362 | A1* | 3/2016 | Barron | G06F 12/0835 710/308 |

FOREIGN PATENT DOCUMENTS

WO        WO99/26144          5/1999
WO        WO2011/031969 A1    3/2011

OTHER PUBLICATIONS

Agarwal, Anant et al., "An Evaluation of Directory Schemes for Cache Coherence", 15th Annual International Symposium on Computer Architecture, May 30-Jun. 2 1988, pp. 280-289.
Alisafaee, Mohammad, "Spatiotemporal Coherence Tracking", The 45th Annual IEEE/ACM International Symposium on Microarchitecture, (MICRO '12), Vancouver, BC, Canada, Dec. 1-5, 2012, 10 pages.
Cantin, Jason F. et al., "Coarse-Grain Coherence Tracking: RegionScout and Region Coherence Arrays", Micro, IEEE, vol. 26, Issue No. 1, Jan-Feb. 2006, pp. 70-79.
Cuesta, Blas et al., "Increasing the Effectiveness of Directory Caches by Deactivating Coherence for Private Memory Blocks", Proceedings of the 38th Annual International Symposium on Computer Architecture (ISCA '11), San Jose, CA, USA, Jun. 4-8, 2011, 11 pages.
Hardavellas, Nikos et al., "Reactive NUCA: Near-Optimal Block Placement and Replication in Distributed Caches", Proceedings of the 36th Annual International Symposium on Computer Architecture (ISCA '09), Austin, TX, Jun. 2009, 12 pages.
Moshovos, Andreas, "RegionScout: Exploiting Coarse Grain Sharing in Snoop-Based Coherence", The 32nd Annual International Symposium on Computer Architecture, ISCA '05, Madison, WI, USA, Jun. 4-8, 2005, 12 pages.
Shaogang, Wang et al., "Optimizing Private Memory Performance by Dynamically Deactivating Cache Coherence", 2012 IEEE 14th International Conference on High Performance Computing and Communications, Liverpool, UK, Jun. 25-27, 2012, 6 pages.

* cited by examiner

ADD-ON MEMORY COHERENCE DIRECTORY

The present application relates generally to an improved data processing apparatus and method and more specifically to mechanisms for an add-on memory coherence directory for multiple processor computer systems.

Memory coherence is an issue that affects the design of computer systems in which two or more processors or cores share a common area of memory. In a single processor system, there is only one processing element doing all the work and, therefore, only one processing element that can read to or write from a given memory location. As a result, when a value is changed, all subsequent read operations of the corresponding memory location will see the updated value, even if it is cached.

Conversely, in multiprocessor (or multicore) systems, there are two or more processing elements working at the same time, and so it is possible that they simultaneously access the same memory location. Provided none of the processors changes the data in this location, the processor can share the data indefinitely and cache the data as it pleases. But as soon as a processor updates the location, the other processors might work on an out-of-date copy that may reside in its local cache. Consequently, some scheme is required to notify all the processing elements of changes to shared values; such a scheme is known as a "memory coherence protocol," and if such a protocol is employed the system is said to have a "coherent memory."

Protocols incorporated in hardware have been developed to maintain memory coherence. Many multiprocessor systems maintain memory coherence with a snoopy protocol. This protocol relies on every processor or memory controller monitoring (or "snooping") all requests to memory. Each processor, or more specifically the cache unit of each processor, independently determines if accesses made by another processor require an update. Snoopy protocols are usually built around a central bus (a snoopy bus). Snoopy bus protocols are very common, and many small-scale systems utilizing snoopy protocols are commercially available.

Alternatively, to maintain memory coherence across the system, a directory-based protocol uses a directory that contains memory-coherence control information. The directory, usually part of the memory subsystem, has an entry for each main memory location with state information indicating whether the memory data may also exist elsewhere in the system. The directory-based coherence protocol specifies all transitions and transactions to be taken in response to a memory request. Any action taken on a memory region, such as a cache line or page, is reflected in the state stored in the directory.

Memory coherence is often referred to as "cache coherence." Each processor may have a local copy of data from shared memory, but that copy would almost always be in a cache or the local copy could be considered a cached copy.

SUMMARY in one illustrative embodiment, a method for memory coherence in a multiple processor system comprises responsive to a memory access resulting in a cache miss in a given processor, determining, by the given processor, whether a memory region being accessed is marked as directory-based. The method further comprises accessing, by the given processor, a directory entry corresponding to the memory region to identify a home chip for the page using a directory-based protocol responsive to the given processor determining the memory region is marked as directory-based. The method further comprises forwarding the memory access request from the given processor to the home chip to perform the memory access.

In one example embodiment, the method performs the memory access using a snooping protocol responsive to the given processor determining the memory region is not marked as directory-based.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
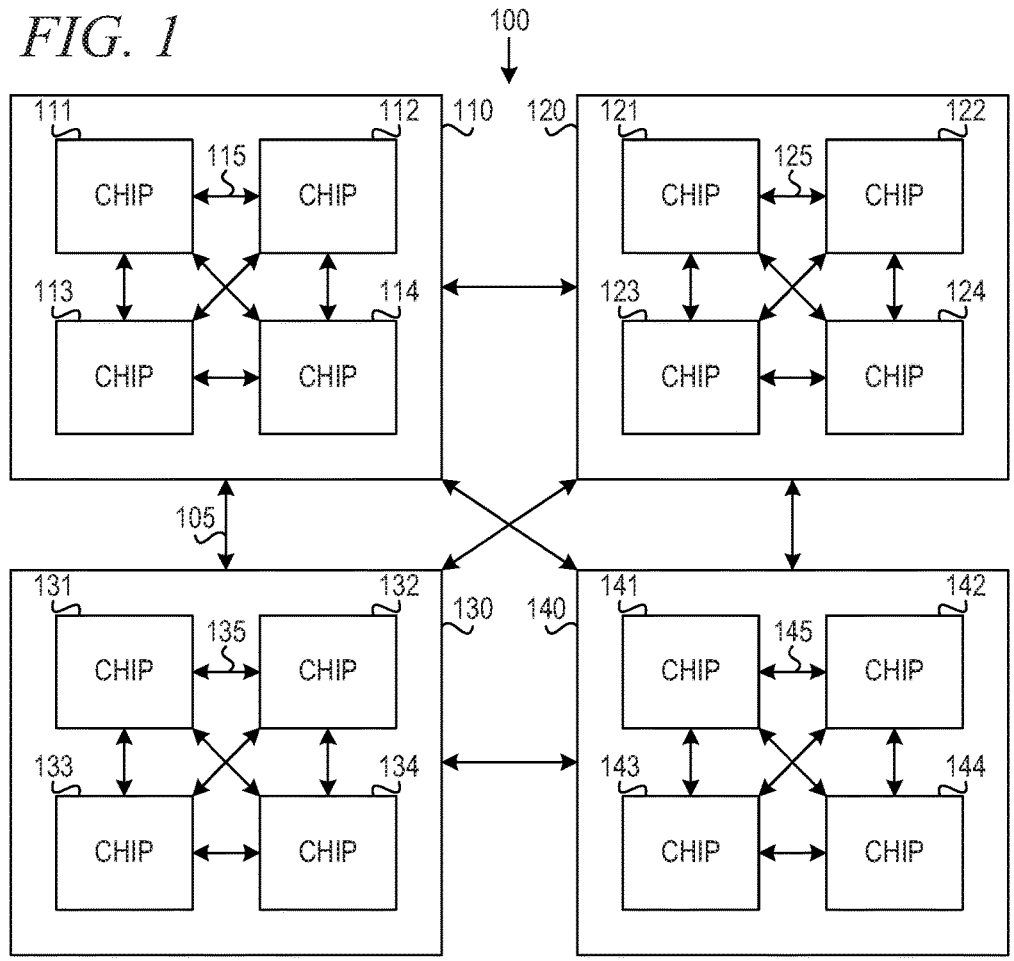
FIG. 1 is an example diagram of a multiple processor data processing system in which aspects of the illustrative embodiments may be implemented.

The illustrative embodiments provide mechanisms for an add-on memory coherence directory for multiprocessor architectures using snoopy memory coherence protocols. The overhead of managing memory coherence in computer servers grows with the size of the system. Current multiple processor data processing systems, such as Power® computer systems, use snoopy-based protocols. Above a certain system size, snoopy protocols no longer scale, and directory-based coherence protocols must be used to maintain coherent shared memory. Replacing the current snoopy protocols with a directory-based protocol would be expensive. Also, a memory coherence directory may become very large as it scales with larger multiple processor systems.

The illustrative embodiments allow an incremental path from snoopy protocols to directory-based protocols. In particular, the mechanisms of the illustrative embodiments selectively use a directory protocol for select regions of memory that would benefit from a directory protocol and use a snoopy protocol for the rest of memory. In one embodiment, the mechanisms use a directory protocol for memory regions with limited sharing, i.e., shared by a small number of processors, and use a snoopy protocol for memory regions that are shared by a large number of processors. Memory regions that are not shared do not require a memory coherence protocol. The threshold that defines limited sharing may be programmatically defined.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
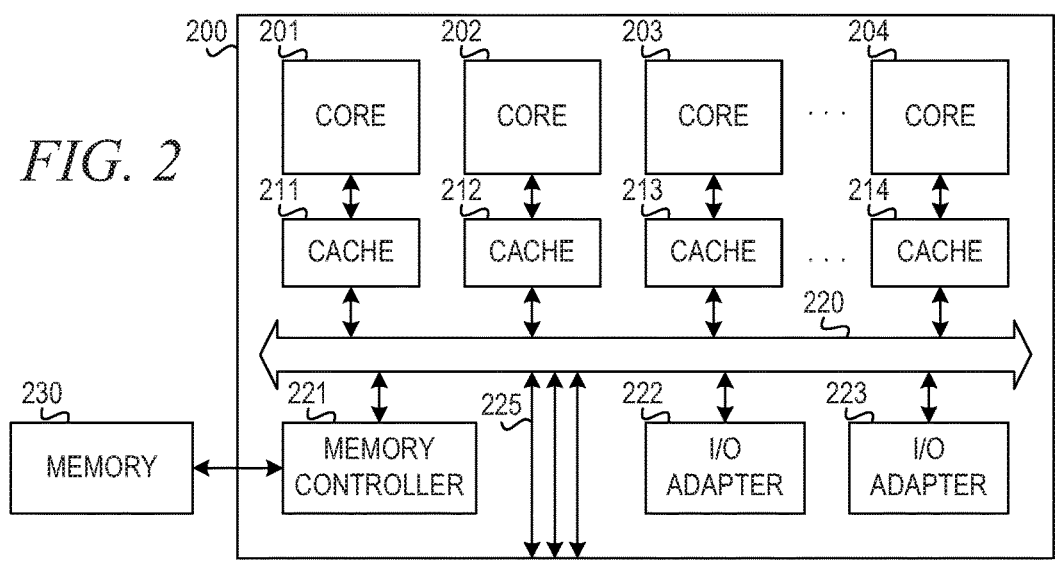
FIG. 2 is an example block diagram of a data processing system chip in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example multiple processor data processing system in which aspects of the illustrative embodiments may be implemented. Data processing system 100 may include a network of computers in which aspects of the illustrative embodiments may be implemented. Data processing system 100 contains nodes 110, 120, 130, 140, each node connected to each other node by buses 105, which may include connections, such as wire, wireless communication links, or fiber optic cables.

In the depicted example, each node includes a plurality of chips containing one or more processors or cores. For instance, node 110 has chips 111-114, each connected to each other chip 111-114 by buses 115; node 120 has chips 121-124, each connected to each other chip 121-124 by buses 125; node 130 has chips 131-134, each connected to each other chip 131-134 by buses 135; and, node 140 has chips 141-144, each connected to each other chip 141-444 by buses 145.

While the depicted example has four nodes, each having four chips, a multiple processor system may include more or fewer nodes or chips depending upon the implementation. In the depicted example, each chip may have eight processor cores, resulting in 128 processors. However, a multiple processor system may include more cores per chip or more chips per node, and the multiple processor system may include more nodes. In one example embodiment, nodes may be combined into books, resulting in thousands or even tens of thousands of processors.

FIG. 2 is a block diagram of an example data processing system chip in which aspects of the illustrative embodiments may be implemented. In the depicted example, data processing system chip 200 is a system-on-a-chip in which a plurality of processor cores 201-204 are connected to system bus 220 via caches 211-214. Data processing system 200 includes memory controller 221 and input/output (I/O) adapters 222, 223 connected to bus 220. Memory controller 221 provides access to memory 230. I/O adapters may be combinations of I/O controllers, such as Ethernet or serial attached SCSI (SAS) controllers, for example. Buses 225 provide connections to other chips or nodes An operating system runs on one or more of processing cores 201-204. The operating system coordinates and provides control of various components within the data processing system 200 in FIG. 2. An object-oriented programming system, such as the Java™ programming system, may run in conjunction with the operating system and provides calls to the operating system from Java™ programs or applications executing on data processing system 200. As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors.

Instructions for the operating system, the object-oriented programming system, and applications or programs are located on storage devices (not shown), and may be loaded into main memory 230 for execution by processing cores 201-204. The processes for illustrative embodiments of the present invention may be performed by processing cores 201-204 using computer usable program code, which may be located in a memory such as, for example, memory 230, for example.

A bus system, such as buses 105, 115 as shown in FIG. 1, may be comprised of one or more buses. Of course, the bus system may be implemented using any type of communication fabric or architecture that provides for a transfer of data between different components or devices attached to the fabric or architecture. A communication unit, such as a modem or network adapter (not shown), may include one or more devices used to transmit and receive data. A memory may be, for example, main memory 230 or a cache such as caches 211-214 in FIG. 2.

Those of ordinary skill in the art will appreciate that the hardware in FIGS. 1 and 2 may vary depending on the implementation, Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SNIP system mentioned previously, without departing from the spirit and scope of the present invention.

Figure 3:
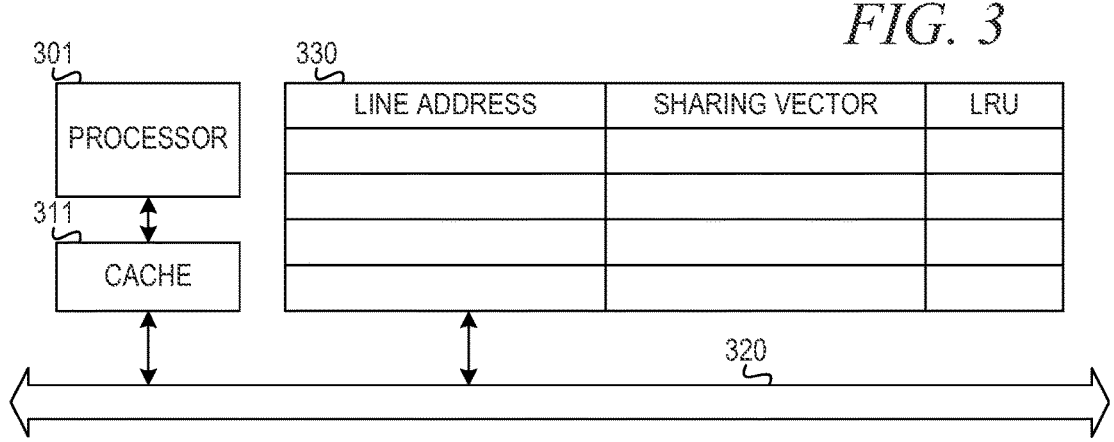
FIG. 3 depicts a mechanism for an add-on directory for memory coherence in accordance with an illustrative embodiment.

FIG. 3 depicts a mechanism for an add-on directory for memory coherence in accordance with an illustrative embodiment, Processor 301 connects to bus 320 to access memory via cache 311. That is, for each memory access, processor 301 first attempts to access cache 311. In one embodiment, the mechanism uses a per page control to indicate which pages are selected for snoopy or directory based protocols. The per-page control may be located in a page table at the home node of the memory page. The home node is assigned by software to increase locality.

In one embodiment, the mechanism uses a chip-level directory. The directory broadcasts and snoops on chip, which uses the basic snoopy protocol but contained to a single chip. Due to the size of the add-on directory 330, the mechanism caches directory entries in cache 311. The cache 311 stores a limited number of entries and conservatively handles cache misses. The cached directory entries may be standard cache entries. The information of the directory entries are dropped on cache eviction, and the information still exists in the system.

Cache miss handling, for handling a miss of the directory cache rather than the processor cache, includes performing a node or system pump to rebuild the sharer vector. A system pump uses the standard snoopy protocol to query all of the processor caches, accessing all process caches to see if they have the requested line of memory. The mechanism installs the directory entry, including the sharer vector, in the cache 311. Then, the mechanism handles the original request. Each entry in add-on directory 330 includes an address, a bit vector of sharing chips, and least recently used (LRU) information. The sharing vector may use more complex encoding for larger system sizes.

Software determines whether a particular page is snoopy or directory based. The software, such as a hypervisor, assigns a home node and stores an entry in the directory cache of the home node. The software assigns the page to a home node to improve locality. For example, the home node may be the first chip to access a page. The software then updates a page table entry for the page to indicate that the page is directory based or snoopy based. The home node or chip may be stored in the page table.

Upon a load or store of a snoopy-based page, the effective-to-real address translation (ERAT) table entry indicates the page is snoopy-based. The processor then performs the load or store using the snoopy protocol. The ERAT is a processor unit that caches page table information. It is specific to POWER processors, but similar units exist in other processors. The page table is a software structure that stores translation from virtual memory addresses to physical memory addresses. The directory holds the sharing vector and LRU information.

Upon a load or store of a directory-based page, the ERAT table entry for the page indicates that the page is directory-based and indicates the home node. The processor sends a bus request to the home node. In one embodiment, for a read request, the processor performs a snoop of the local chip in parallel, and if there is a hit, the local snoop returns data according to the standard snoopy protocol. If there is a local hit, the mechanism does not need to update the sharer vector.

The home node handles the request as appropriate. For a read, the home node forwards the request to a sharer to forward the data to the requestor. For a write, the home node sends invalidates to all sharers and sends confirmation when all sharers have invalidated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as lava, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart, and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
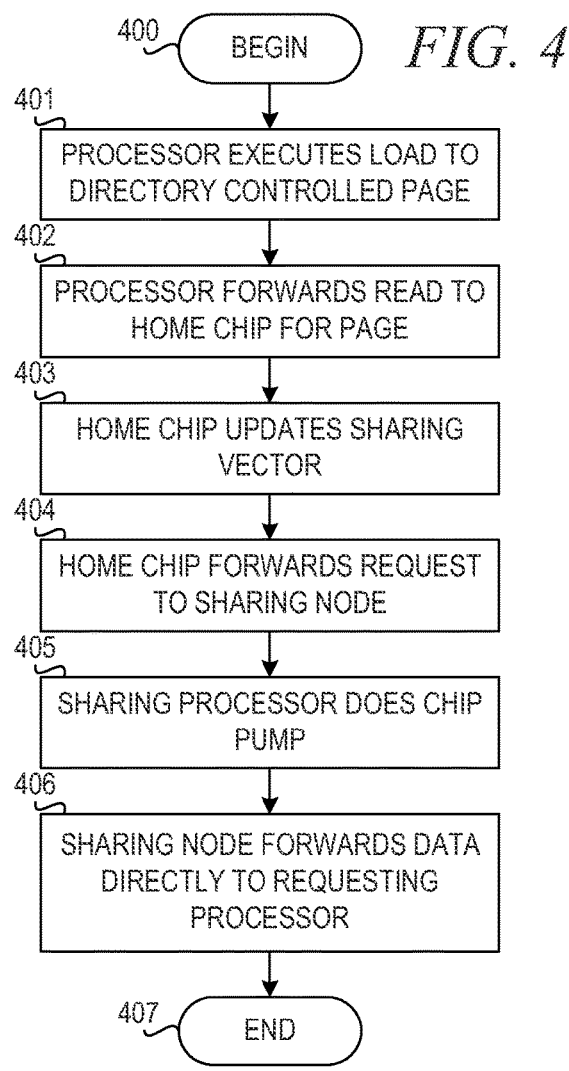
FIG. 4 is a flowchart illustrating operation of servicing a load request for a directory-based page in accordance with an illustrative embodiment.

FIG. 4 is a flowchart illustrating operation of servicing a load request for a directory-based page in accordance with an illustrative embodiment. Operation begins with a load to a directory load page responsive to the load resulting in a cache miss and the processor determining that the memory region (e.g., page) is marked as a "limited sharing" or directory-based memory region (block 400), and the processor executes a load to a directory controlled page (block 401). The processor forwards the read request to the home chip for the page (block 402). The home chip updates the sharing vector (block 403) to indicate that the requesting processor is a sharer. The hope chip then forwards the read request to a sharing node (block 404).

Then, the sharing processor does a chip pump (block 405). A chip pump is a snoop of all cores or caches on a chip. The sharing processor then forwards the data directly to the requesting processor (block 406). Thereafter, operation ends (block 407).

Figure 5:
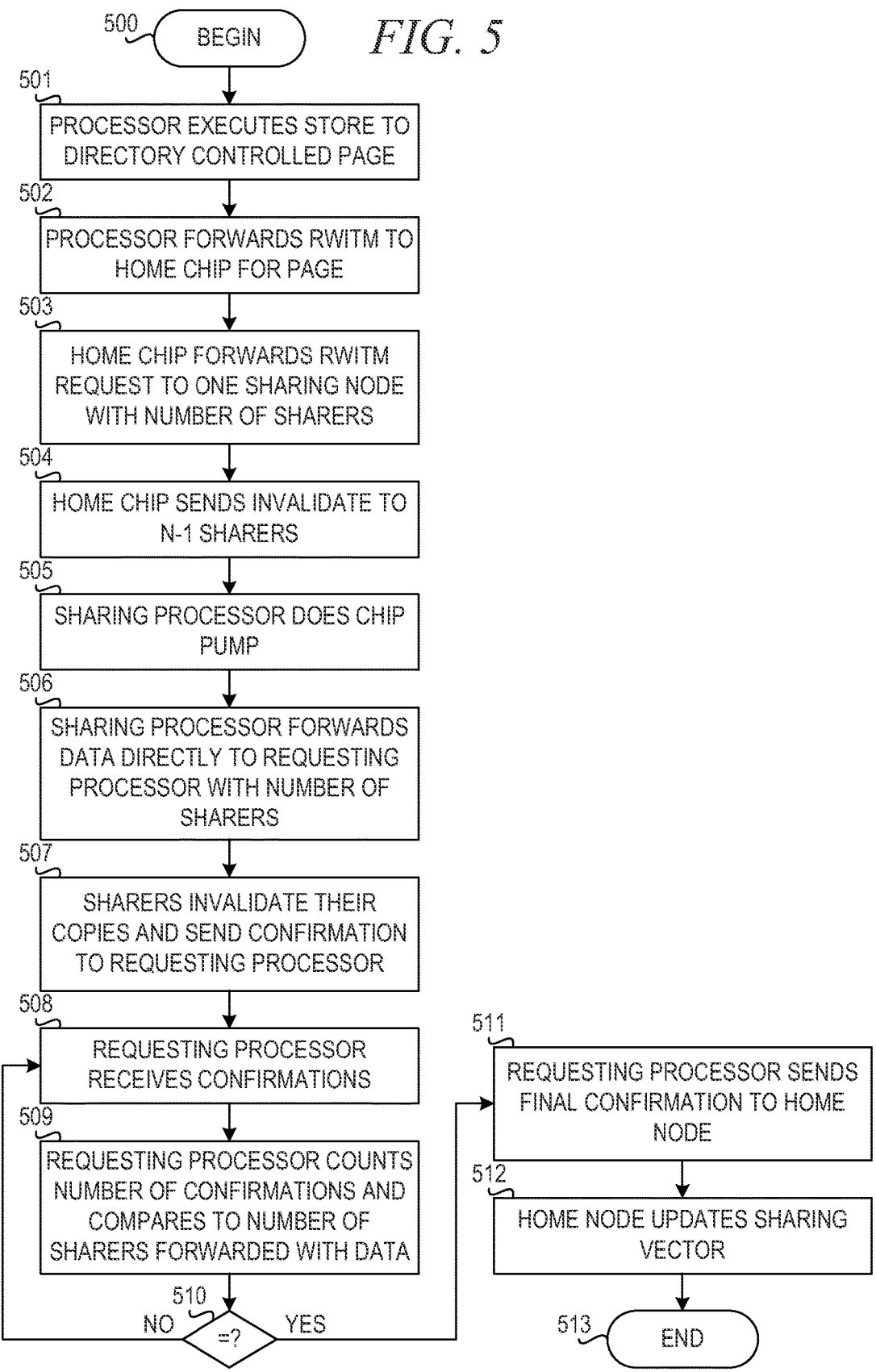
FIG. 5 is a flowchart illustrating operation of servicing a store request for a directory-based page in accordance with an illustrative embodiment.

FIG. 5 is a flowchart illustrating operation of servicing a store request for a directory-based page in accordance with an illustrative embodiment. Operation begins with a store to a directory load page responsive to the store resulting in a cache miss and the processor determining that the memory region (e.g., page) is marked as a "limited sharing" or directory-based memory region (block 500), and the processor executes a store to a directory controlled page (block 501). The processor forwards a read with intent to modify (RWITM) request to the home chip for the page (block 502). The home chip forwards the RWITM request to one sharing node with the number (N) of sharers (block 503). The home chip sends invalidates to N−1 sharers (block 504).

The sharing processor does a chip pump (block 505) and forwards the data directly to the requesting processor with the number (N) of sharers (block 506). The sharers invalidate their copies of the data and send confirmation to the requesting processor (block 507). Invalidation comes from the home chip, but the confirmations go to the requestor. The requestor cannot proceed until it gets the confirmation.

The requesting processor receives the confirmations (block 508). The requesting processor counts the number of confirmations and compares to the number of sharers forwarded with the data (block 509). The requesting processor determines whether the number of confirmations equals the number of sharers (block 510). If the numbers are not equal, operation returns to block 508 to receive confirmations.

If the number of confirmations equals the number of sharers in block 510, the requesting processor sends the final confirmation to the home node (block 511). The home node then updates the sharing vector (block 512), and operation ends (block 513).

Figure 6:
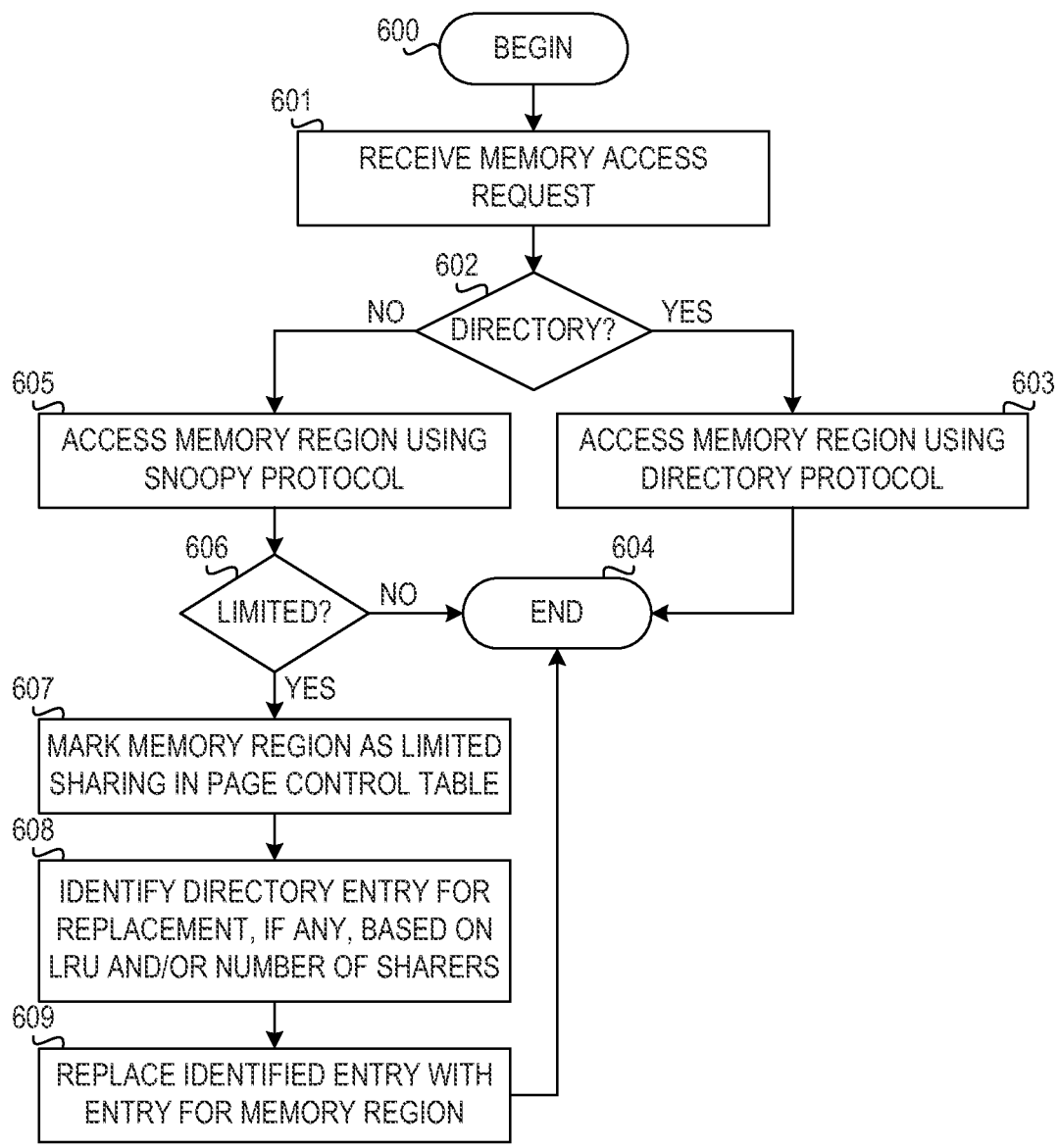
FIG. 6 is a flowchart illustrating operation of a mechanism for managing an add-on directory in accordance with an illustrative embodiment.

FIG. 6 is a flowchart illustrating operation of a mechanism for managing an add-on directory in accordance with an illustrative embodiment. Operation begins (block 600), and the mechanism receives a memory access request (block 601). The mechanism determines whether the memory region (e.g., page) being accessed is directory based or snoopy based (block 602). If the memory region is directory based, the mechanism accesses the memory region using the directory protocol (block 603). Thereafter, operation ends (block 604).

If the memory region is snoopy based in block 602, the mechanism accesses the memory region using the snoopy protocol (block 605). The mechanism determines whether the memory region is limited sharing (block 606). In one embodiment, the mechanism may determine that the memory region is limited sharing responsive to determining that the memory region is being shared by a small plurality of sharers. In one example embodiment, the mechanism may determine whether the number of sharers is greater than one and less than a preset threshold. The mechanism may adjust the threshold to ensure that directory based memory coherence is used for those memory regions receiving the greatest benefit. If the mechanism determines that the memory region is not limited sharing, then operation ends (block 604).

If the mechanism determines that the memory region is limited sharing in block 606, the mechanism marks the memory region as limited sharing in the page control table (block 607). The mechanism identifies a directory entry for replacement, if any, based on the least recently used (LRU) information or based on the number of sharers (block 608), For instance, in one embodiment, the mechanism replaces the least recently used directory entry. In alternative embodiment, the mechanism may replace a directory entry for a memory region having a greatest number of sharers. In yet another embodiment, the mechanism selects a least recently used directory entry among those entries having a number of sharers greater than the threshold. The mechanism replaces the identified entry with an entry for the memory region being accessed (block 609). Thereafter, operation ends (block 604).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The add-on memory coherence directory of the illustrative embodiments is light weight, conservative, and selective. The mechanisms of the illustrative embodiments may turn on the directory-based protocol for the cases in which a directory protocol is more beneficial compared to snoopy protocols. The add-on directory provides an incremental path to the directory protocol and increased scalability. The mechanisms of the illustrative embodiments may learn how often the directory protocol helps performance and adjust the threshold for "limited sharing" accordingly. The illustrative embodiments are low risk, because the mechanisms can turn off the directory protocol for the cases that the directory protocol is not beneficial. Also, the add-on directory has low area and power overhead.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed, Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for memory coherence in a multiple processor system, the method comprising:
   responsive to determining a number of sharers of a given memory region is greater than one and less than a threshold, marking the memory region as directory-based in an effective-to-real address translation table and storing a new directory entry for the memory region in an add-on cache directory;
   responsive to a memory access resulting in a cache miss in a given processor, determining, by the given processor, whether the accessed memory region is marked as directory-based in the effective-to-real address translation table;
   responsive to the given processor determining the accessed memory region is not marked as directory-based, performing the memory access using a snooping protocol; and
   responsive to the given processor determining the accessed memory region is marked as directory-based in the effective-to-real address translation table, access a directory entry corresponding to the accessed memory region from the add-on cache directory to identify a home chip for the accessed memory region using a directory-based protocol and forwarding the memory access request from the given processor to the home chip to perform the memory access.

2. The method of claim 1, wherein the directory entry comprises a sharing vector, wherein the sharing vector comprises a bit vector having a bit for each chip in the multiple processor system and wherein each bit in the bit vector is asserted if the corresponding chip is sharing the accessed memory region.

3. The method of claim 1, further comprising caching the directory entry in a directory cache of the given processor.

4. The method of claim 3, wherein the directory entry comprises least recently used (LRU) information for identifying candidate directory entries in the cache to replace.

5. The method of claim 1, wherein the memory access request is a load request and wherein the home chip forwards a read request to a sharing node, the sharing node services the read request, and the sharing node forwards data for the read request directly to the given processor.

6. The method of claim 5, wherein the sharing node services the read request on a given chip locally using a directory protocol.

7. The method of claim 5, wherein the home node updates a sharing vector in the directory entry.

8. The method of claim 1, wherein the memory access request is a store request and wherein the given processor forwards a read with intent to modify (RWITM) request to the home chip, the home chip forwards the RWITM request and a number of sharers to a sharing node, the home chip sends invalidate notifications to the sharers, the sharing node services the RWITM request, and the sharing node forwards data for the RWITM request directly to the given processor.

9. The method of claim 8, wherein the sharing node services the RWITM request on a given chip locally using a directory protocol.

10. The method of claim 8, further comprising:
receiving, by the given processor, the data for the RWITM request and the number of sharers;
counting, by the given processor, confirmation notifications indicating the sharers have invalidated their copies of the data; and
responsive to the number of confirmation notifications equaling the number of sharers, sending a final confirmation message to the home node.

11. The method of claim 8, wherein the home node updates a sharing vector in the directory entry.

12. The method of claim 1, further comprising:
attempting, by the given processor, to service the memory access locally using a snooping protocol in parallel with forwarding the memory access request to the home chip to perform the directory-based memory access.

13. The method of claim 1, wherein storing the new directory entry for the memory region in the add-on cache directory comprises:
identifying a directory entry to be replaced from the add-on cache directory; and
replacing the identified directory entry with the new directory entry in the add-on cache directory.

14. The method of claim 13, wherein identifying the directory entry to be replaced comprises identifying a least recently used directory entry in the add-on cache directory.

15. The method of claim 13, wherein identifying the directory entry to be replaced comprises identifying a directory entry having a highest number of sharers.

16. The method of claim 13, wherein identifying the directory entry to be replaced comprises identifying a subset of directory entries in the add-on cache directory having a number of sharers greater than the threshold and identifying a least recently used directory entry within the subset of directory entries.

* * * * *